US005223830A

United States Patent [19]
Romes

[11] Patent Number: 5,223,830
[45] Date of Patent: Jun. 29, 1993

[54] SENSOR CIRCUIT

[75] Inventor: Roman Romes, Friolzheim, Fed. Rep. of Germany

[73] Assignee: Robert Bosch GmbH, Stuttgart, Fed. Rep. of Germany

[21] Appl. No.: 682,578

[22] Filed: Apr. 8, 1991

[30] Foreign Application Priority Data

Jun. 2, 1990 [DE] Fed. Rep. of Germany ....... 4017843

[51] Int. Cl.⁵ .............................................. G08C 19/06
[52] U.S. Cl. ......................... 340/870.35; 340/870.36; 324/207.18; 324/207.19
[58] Field of Search ...................... 340/870.35, 870.36, 340/870.32; 364/571.07; 324/207.17, 207.18, 207.19, 140

[56] References Cited

U.S. PATENT DOCUMENTS 3,079,545 2/1963 Kretsch et al. ............ 340/870.35 X
4,088,952 5/1978 Sikora ..................... 324/207.18 X Primary Examiner—Donald J. Yusko
Assistant Examiner—Michael Horabik
Attorney, Agent, or Firm—Michael J. Striker

[57] ABSTRACT

A sensor circuit has a measuring circuit in which measuring signals occur at two different circuit points and signals at one point change oppositely to signals at the other point during changing of measuring values, and an evaluating circuit for evaluating measuring signals and outputting a sensor signal. The measuring circuit delivers the signals from the both points separately to the evaluating circuit. The evaluating circuit is formed so that it forms a difference of the both measuring signals and, for operational control of the sensor circuit, checks whether the measuring signals actually change oppositely to one another always within predetermined error limits.

3 Claims, 2 Drawing Sheets

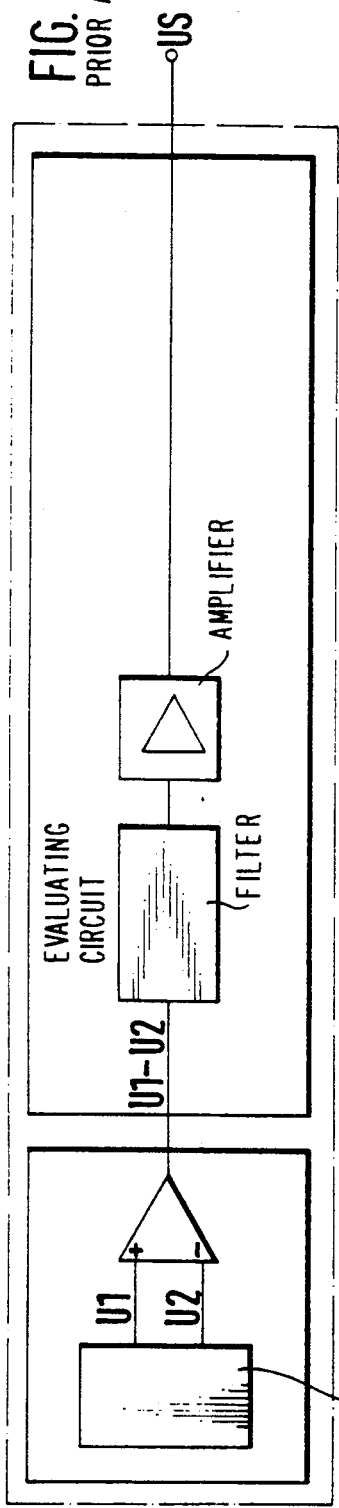
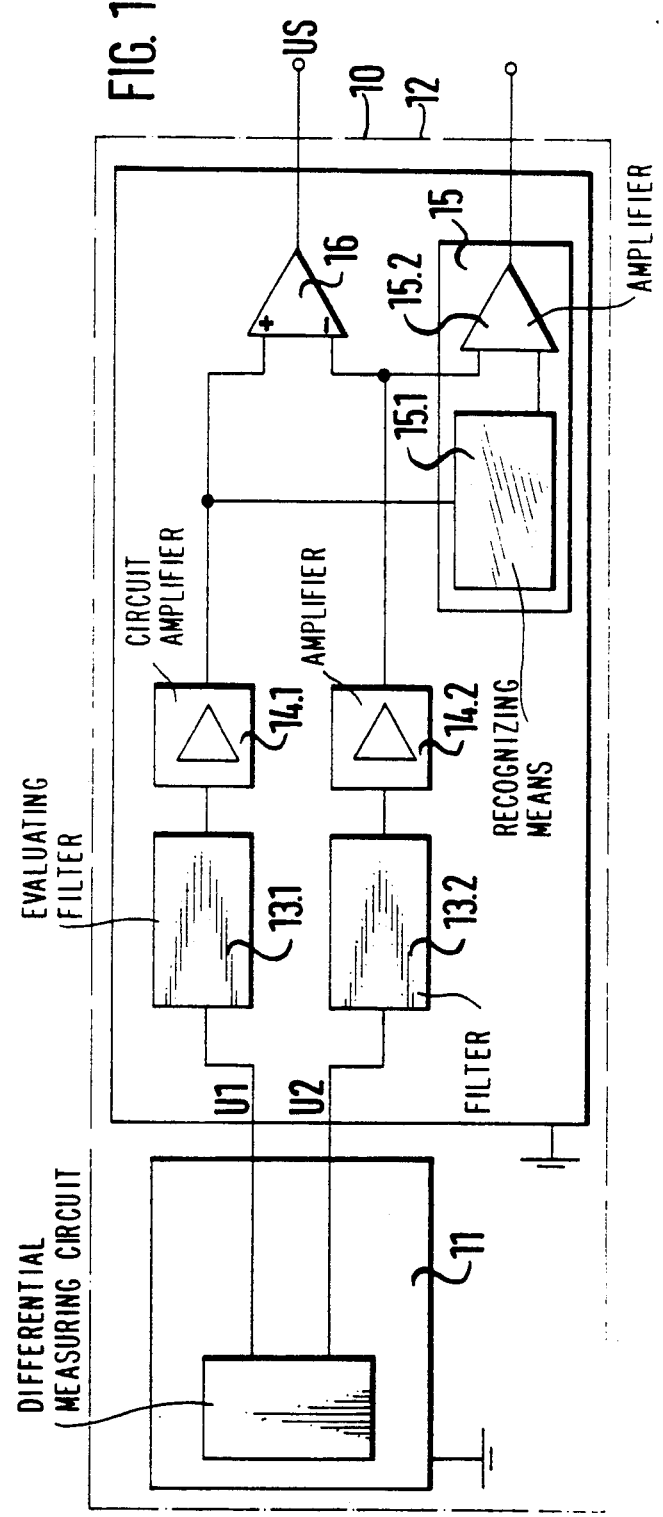

SENSOR CIRCUIT

BACKGROUND OF THE INVENTION

The present invention relates to a sensor circuit. More particularly it relates to such a sensor circuit which has a measuring circuit producing a signal depending on a variable value and an evaluating circuit, which leads to the fact that the signal given by the measuring circuit is for example to be smoothed or to be amplified.

Measuring circuits and especially so-called differential measuring circuits are important within the sensor circuits. They are formed as measuring circuits in which measuring voltages occur at two different switching points, and the signals at one point change in opposite direction to the signals at the other point during the change of the measuring values. The conventional measuring circuits of this type are all modifications of bridge circuits. Further examples of these measuring circuits are so-called differential trafo displacement pickups and differential throttle displacement pickups. The decisive trick in the known differential measuring circuits is that the difference between the above mentioned two measuring voltages is formed. Thereby a signal is produced whose change during a predetermined change of the measuring value is double the size of the change for one or both measuring voltages. Thereby this signal/noise ratio is improved. Moreover, non-linearities and temperature fluctuations of the individual measuring voltages are eliminated by the differential formation.

Due to the above mentioned advantages the conventional differential measuring circuits are normally used where reliable and accurate measurement is required. In such cases it is frequently important that the operability of the sensor circuit in which the differential measuring circuit is arranged is to be monitored. This is performed by doubled execution of the sensor circuit and by comparison of the sensor signals produced by both sensors. When the signals are not plausible to one another an error signal is produced.

It is generally desirable in practice to design such sensor circuits so that they are as simple as possible and therefore form reliable devices.

SUMMARY OF THE INVENTION

Accordingly, it is an object of the present invention to provide a sensor circuit which is a further improvement of existing sensor circuits of the above-mentioned general type.

In keeping with these objects and with others which will become apparent hereinafter, one feature of the present invention resides, briefly stated, in a sensor circuit which has a measuring circuit in which the measuring voltages occur at two different switching points and the signal at one point changes oppositely to the signal at the opposite point during changes of the measuring values, wherein the measuring circuit separately produces the signals from the above mentioned both points, and an evaluating circuit which receives both sensor signals and forms a difference from these signals, and also for operational control of the sensor circuit checks whether the signals actually change oppositely to one another always, within predetermined error limits.

In the inventive sensor circuit, a measuring circuit is utilized which produces oppositely changing measuring voltages. However, the measuring voltage is not executed as complete differential circuit which produces a difference of the above-mentioned measuring voltages but instead it delivers the measuring voltages separately to the evaluating circuit which due to the separate delivery provides for the possibility to check whether both voltages actually change always opposite to one another. The differential signal which is finally desired as the sensor signal is formed by the evaluating circuit from the measuring circuit.

The feature that both measuring voltages must always change opposite to one another has positively the result that the sum of both voltages must be constant. Thereby it can be for example very easily checked whether the voltage supply of the sensor circuit operates in an orderly fashion. When the plausibility control is performed far behind in the signal course in the evaluating circuit, moreover almost a total evaluating circuit can be checked as to its operational control. There is here an advantage that the plausibility control is first performed with the individual measuring signals when they are filtered and amplified if such features are required.

In the inventive sensor circuit two signals occurring in the measuring circuit are utilized for error control. Thereby it is no longer required to determine such measuring values with a second sensor circuit, for performing a plausibility control.

It is also of advantage that the operational control is performed within the evaluating circuit with digital steps, since it is therefore possible to differentiate many errors without high circuitry expenses. Preferably in such a case a measuring region table in the evaluating circuit is used, which measuring tables stores the values of the value region of the other measuring signal permissible for one of the both measuring signals. With a (logically executed) comparator means it is compared whether the actual value of the other measuring signal falls within the value region, which due to the actual value of the other measuring signal is read from the table.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a block diagram a sensor circuit with a measuring circuit producing two oppositely changing measuring signals so that therefore an error control is performed in an evaluating circuit;

FIG. 4 is a block diagram of a known sensor circuit with a differential measuring circuit and an evaluating circuit without error control.

DESCRIPTION OF THE PREFERRED EMBODIMENTS

Figure 2:
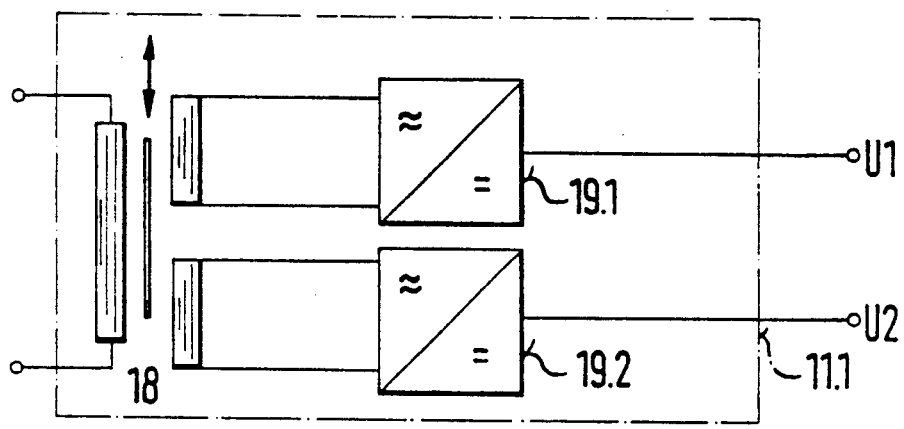
FIG. 2 is a block diagram of a measuring circuit which is used for the sensor circuit of FIG. 1 and formed as a differential trafo displacement pickup.

FIG. 4 shows a known sensor circuit with a differential measuring circuit and an evaluating circuit. Two voltages U1 and U2 occur in the differential measuring circuit and change in opposite directions. In the differential measuring circuit the differential signal U1−U2 is formed and supplied to the evaluating circuit. In the evaluating circuit, as shown in FIG. 4 a filter and an amplifier are provided. The filtered and amplified differential signal is outputted as a sensor voltage US.

A sensor circuit 10 in FIG. 1 has a measuring circuit 11, in which at two different switching points oppositely changing measuring voltages U1 and U2 occur. This measuring circuit is however not formed as a differential measuring circuit since it does not produce a differential signal U1−U2 but instead supplies both measuring voltages U1 and U2 separately to an evaluating circuit 12. In the evaluating circuit 12 both measuring signals are smoothed separately through filters 13.1 or 13.2 and amplified by amplifiers 14.1 or 14.2. The smoothed and amplified measuring signals are supplied to an error recognizing means 15 and a differential amplifier 16 which forms the difference of both measuring signals and outputs this difference as a sensor signal US.

The error recognizing means 15 is provided by a measuring region table 15.1 and a comparator means 15.2 realized by a program. In the measuring region table 15.1 the respective actual measuring value of one measuring signal is applied. The measuring region table then produces a permissible value region for the other measuring signal. In the comparator means 15.2 it is checked whether the other measuring signal falls in the read-out value region. When it is not the case, an error signal is produced. It shows that the sensor circuit operates not in an orderly fashion.

FIG. 2 shows a block diagram of a measuring circuit 11.1 for detecting signals from a differential trafo displacement pickup 18. The both secondary windings of the displacement pickup are not switched so that only differential signal U1−U2 can be detected as is conventional, but instead it is formed so that both voltages can be executed separately. Therefore equidirectional voltages U1 and U2 are produced, and after this the voltages detected by the secondary windings are rectified in rectifiers 19.1 and 19.2.

Figure 3:
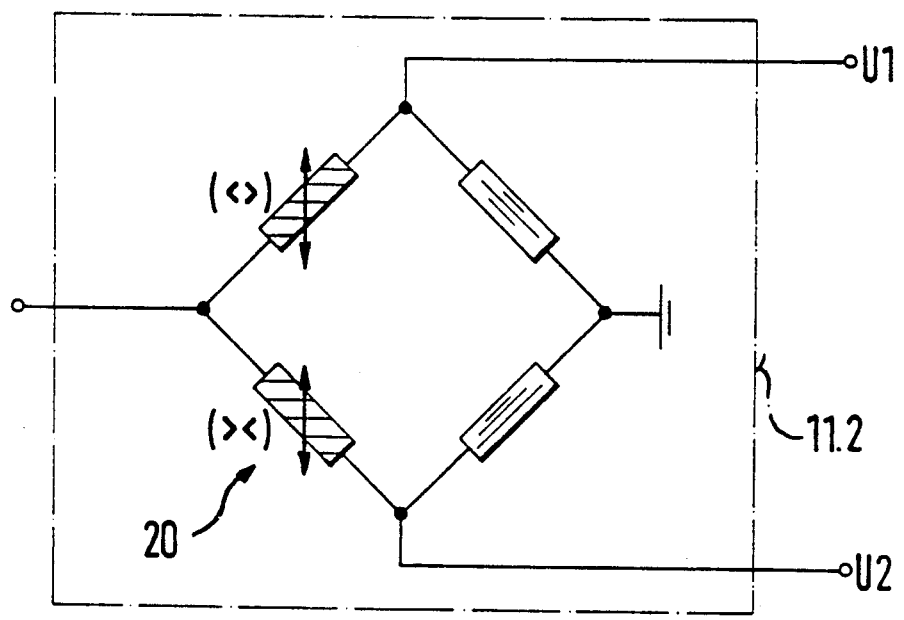
FIG. 3 is a view showing a block diagram of a measuring circuit which is used for the sensor circuit of FIG. 1 and formed as a bridge circuit.

FIG. 3 shows a measuring circuit 11.2 which is formed as a bridge circuit 20. Here it is also important that the oppositely changing voltages U1 and U2 occurring at two oppositely located bridge points are outputted separately. In the circuit both elements in the left bridge branches are represented as variable elements. They can be capacitive elements, such as for example variable capacitors, inductive elements or resistors. Especially when resistors are available, the elements can be variable in all four bridge branches. These arrangements are conventional. It is important that the difference of the voltages U1 and U2 is not formed inside the measuring circuit, but instead these both voltages are supplied separately to the evaluating circuit 12 of FIG. 1. The variable elements are switched so that the voltage outputted from a first element increases, when the voltage outputted from the other element reduces (for example the circuit formed as pulling or pressing sensor), and vice versa as identified in FIG. 3 by the symbols (<>) and (><).

It should be pointed out that in the sensor circuit in accordance with FIG. 1 only three features are important, namely that the opposite changing measuring voltages U1 and U2 are separately delivered from the measuring circuit to the evaluating circuit, the evaluating circuit performs an operational control with the aid of the error recognizing means which can operate(logically with a program), and the evaluating circuit forms a sensor signal US on the basis of the difference of both measuring signals U1 and U2 outputted from the measuring circuit.

It is immaterial whether a filter and/or an amplifier executes the measuring signals or other signal-forming features to the measuring signals or such features are executed inside the measuring circuit or inside the evaluating circuit.

It will be understood that each of the elements described above, or two or more together, may also find a useful application in other types of constructions differing from the types described above.

While the invention has been illustrated and described as embodied in a sensor circuit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A sensor circuit, comprising a measuring circuit in which measuring signals occur at two different circuit points and signals at one point change oppositely to signals at the other point during changing of measuring values; and an evaluating circuit for evaluating measuring signals and outputting a sensor signal, the measuring circuit delivering the signals from said both points separately to said evaluating circuit, said evaluating circuit being formed so that it forms a difference of the both measuring signals and, for operational control of the sensor circuit, checks whether the measuring signals actually change oppositely to one another always, within predetermined error limits, said evaluating circuit having a measuring region table which stores values of a value region of another measuring signal which is permissible for one of both measuring signals, and a comparator means operative for comparing whether an actual value of the other measuring signal falls within the value region which due to the actual value of the one measuring signal can be read from the table.

2. A sensor circuit as defined in claim 1, wherein said measuring circuit has a differential trafo displacement pickup.

3. A sensor circuit as defined in claim 1, wherein said measuring circuit has a bridge circuit.

* * * * *